(12) United States Patent
Sugirtharaj et al.

(10) Patent No.: US 10,701,565 B2
(45) Date of Patent: Jun. 30, 2020

(54) NETWORK NODE, METHOD AND COMPUTER PROGRAM PRODUCT FOR SCHEDULING OF PAGING MESSAGES WITH RESPECT TO DISCOVERY SIGNAL TRANSMISSIONS

(71) Applicant: Telefonaktiebolaget LM Ericsson (publ), Stockholm (SE)

(72) Inventors: David Sugirtharaj, Lund (SE); Peter Alriksson, Horby (SE); Mai-Anh Phan, Herzogenrath (DE); Emma Wittenmark, Lund (SE)

(73) Assignee: TELEFONAKTIEBOLAGET LM ERICSSON (PUBL)

( * ) Notice: Subject to any disclaimer, the term of this patent is extended or adjusted under 35 U.S.C. 154(b) by 0 days.

(21) Appl. No.: 16/087,653

(22) PCT Filed: Mar. 23, 2017

(86) PCT No.: PCT/EP2017/056966
§ 371 (c)(1),
(2) Date: Sep. 23, 2018

(87) PCT Pub. No.: WO2017/162813
PCT Pub. Date: Sep. 28, 2017

(65) Prior Publication Data
US 2019/0124517 A1    Apr. 25, 2019

Related U.S. Application Data

(60) Provisional application No. 62/312,805, filed on Mar. 24, 2016.

(51) Int. Cl.
*H04W 16/14* (2009.01)
*H04W 8/00* (2009.01)
(Continued)

(52) U.S. Cl.
CPC .......... *H04W 16/14* (2013.01); *H04W 8/005* (2013.01); *H04W 68/00* (2013.01); *H04W 74/0808* (2013.01); *H04W 48/12* (2013.01)

(58) Field of Classification Search
CPC ..... H04W 16/14; H04W 48/12; H04W 68/00; H04W 74/0808; H04W 8/005
See application file for complete search history.

(56) References Cited

U.S. PATENT DOCUMENTS

2009/0279513 A1* 11/2009 Chang ................. H04L 1/06
370/336
2013/0336135 A1   12/2013 Lindoff et al.
(Continued)

OTHER PUBLICATIONS

PCT International Search Report, dated Jun. 19, 2017, in connection with International Application No. PCT/EP2017/056966, all pages.
(Continued)

*Primary Examiner* — Stephen J Clawson
(74) *Attorney, Agent, or Firm* — Leffler Intellectual Property Law, PLLC

(57) ABSTRACT

A network node for wireless access is operating in a cellular network for an unlicensed frequency band and arranged for serving wireless devices in the unlicensed frequency band. The serving of the wireless devices in the unlicensed band relies on making a clear channel assessment in the unlicensed band for ascertaining that the unlicensed band is currently not occupied by other transmissions and when not occupied commencing transmission. Upon commencing the transmission, the network node is arranged to attempt scheduling a paging message together with a message providing a discovery signal and determine whether the transmission of the discovery signal and the paging message use the same subframe scrambling code, and if they do, transmit the paging message and the discovery signal in the same sub-
(Continued)

frame. A method and computer program for the network node are also disclosed.

20 Claims, 8 Drawing Sheets

(51) Int. Cl.
*H04W 68/00* (2009.01)
*H04W 74/08* (2009.01)
*H04W 48/12* (2009.01)

(56) References Cited

U.S. PATENT DOCUMENTS

| | | | |
|---|---|---|---|
| 2014/0133474 A1* | 5/2014 | Damnjanovic | H04W 52/30 370/336 |
| 2015/0264699 A1* | 9/2015 | Fwu | H04L 5/0091 370/329 |
| 2016/0044652 A1 | 2/2016 | Xue et al. | |
| 2018/0054248 A1* | 2/2018 | Kahtava | H04B 7/15 |

OTHER PUBLICATIONS

PCT Written Opinion, dated Jun. 19, 2017, in connection with International Application No. PCT/EP2017/056966, all pages.
3GPP TSG RAN WG1 #83, R1-157041, Nov. 14-22, 2015, Anaheim, USA, Qualcomm Inc., Discovery and RRM procedure for LAA, 5 pages.
3GPP TSG RAN WG1 Meeting #83, R1-156440, Anaheim, USA, Nov. 15-22, 2015, Huawei, HiSilicon, Remaining details of DRS design for LAA, 5 pages.
3GPP TSG-RAN WG1 Meeting #70bis, R1-124515, San Diego, USA, Oct. 8-12, 2012, Nokia, Nokia Siemens Networks, Paging and CSI-RS, 3 pages.
MFA-TSG Meeting #3, MFA-TSG-3.88, Kista, Sweden, Feb. 29-Mar. 3, 2016, Qualcomm, Paging Procedure, 5 pages.
MFA TSWG RAN #3, Stockholm, Sweden, Mar. 1-3, 2016, Ericsson, Paging Design, 5 pages.
3GPP TS 36331 V13.0.0, Dec. 2012, 3rd Generation Partnership Project; Technical Specification Group Radio Access Network; Evolved Universal Terrestrial Radio Access (E-UTRA); Radio Resource Control (RRC); Protocol specification, Release 13, 507 pages.
3GPP TS 36.213 V13.0.1, Jan. 2016, 3rd Generation Partnership Project; Technical Specification Group Radio Access Network; Evolved Universal Terrestrial Radio Access (E-UTRA); Physical layer procedures, Release 13, 326 pages.
3GPP TS 36.211 V13.0.0, Dec. 2015, 3rd Generation Partnership Project; Technical Specification Group Radio Access Network; Evolved Universal Terrestrial RAdio Access (E-UTRA); Physical channels and modulation, Release 13, 141 pages.

* cited by examiner

Aggregated bandwidth of 100 MHz

NETWORK NODE, METHOD AND COMPUTER PROGRAM PRODUCT FOR SCHEDULING OF PAGING MESSAGES WITH RESPECT TO DISCOVERY SIGNAL TRANSMISSIONS

CROSS-REFERENCE TO RELATED APPLICATIONS

This application is a 371 national stage application of PCT/EP2017/056966, filed Mar. 23, 2017, which claims the benefit of U.S. Provisional Application No. 62/312,805, filed Mar. 24, 2016, which are both hereby incorporated herein by reference in their entireties.

TECHNICAL FIELD

The present invention generally relates to a network node, method and computer program product for scheduling of paging messages with respect to discovery signal transmissions.

ABBREVIATIONS

| Abbreviation | Explanation |
| --- | --- |
| CCA | Clear Channel Assessment |
| DCI | Downlink Control Information |
| DL | Downlink |
| DMRS | Demodulation Reference Signals |
| eNB | evolved NodeB, base station |
| eSSS | enhanced SSS |
| TTI | Transmission-Time Interval |
| UE | User Equipment |
| UL | Uplink |
| LA | Licensed Assisted |
| LAA | Licensed Assisted Access |
| DRS | Discovery Reference Signal |
| RTCIF | Report RSSI Timestamp on Cell Identification Failure |
| SCell | Secondary Cell |
| SRS | Sounding Reference Signal |
| SSS | Secondary Synchronization Signal |
| LBT | Listen-before-talk |
| OCC | Orthogonal Cover Code |
| PDCCH | Physical Downlink Control Channel |
| PSS | Primary Synchronization Signal |
| PUSCH | Physical Uplink Shared Channel |
| PUCCH | Physical Uplink Control Channel |
| RRC | Radio Resource Control |
| RRM | Radio Resource Management |
| TCS | Transmission Confirmation Signal |
| MFA | MuLTEFire Alliance |

BACKGROUND

Cellular communication systems have traditionally used licensed frequency bands, and still use. The 3$^{rd}$ Generation Partnership Project (3GPP) initiative "License Assisted Access" (LAA) intends to allow Long Term Evolution (LTE) equipment to also operate in the unlicensed radio spectrum such as the 5 GHz band. The unlicensed spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

In addition to LAA operation, it should be possible to run LTE fully on the unlicensed band without the support from the licensed band. This is called LTE-U Stand Alone.

Regulatory requirements, however, may not permit transmissions in the unlicensed spectrum without prior channel sensing. Since the unlicensed spectrum must be shared with other radios of similar or dissimilar wireless technologies, a so called listen-before-talk (LBT) method needs to be applied. Today, the unlicensed 5 GHz spectrum is mainly used by equipment implementing the IEEE 802.11 Wireless Local Area Network (WLAN) standard. This standard is known under its marketing brand "Wi-Fi."

The LBT procedure leads to uncertainty at the eNodeB (eNB) regarding whether it will be able to transmit a downlink (DL) subframe(s) or not. This leads to a corresponding uncertainty at the user equipment (UE) as to if it actually has a subframe to decode or not. An analogous uncertainty exists in the UL direction where the eNB is uncertain if the UEs actually transmitted or not.

In the unlicensed radio spectrum, eNB must perform listen before talk (LBT) prior to data transmission on unlicensed band. LBT Category 4 with exponential backoff is a non-aggressive scheme that allows good coexistence with Wi-Fi and other unlicensed spectrum users. The discovery signal that is transmitted every 40 ms or so is an important reference signal transmitted to allow the UE to maintain coarse synchronization with the eNB. It will use a more aggressive LBT mechanism to ensure that it is not starved. Even so, due to the load in the band it cannot be guaranteed that it will always succeed. Current assumption is, that the start of the discovery signal is restricted to LTE subframe borders and that the start of regular data transmissions is restricted to a few fixed positions within the subframe, including the subframe border.

In Standalone operations, the PCell will also operate on the unlicensed carrier and thus essential control signals and channels will also be subject to unmanaged interference and LBT. New aspects/challenges if PCell must operate in unlicensed spectrum:

The UE is required to listen to paging requests in the unlicensed spectrum

Mobility must work in an unsynchronized unplanned network

Mobility must work in an environment with dynamic neighbour relations

Further the carrier (re)selection process (when the network node changes its carrier frequency during operation) becomes more problematic when it is also applied to the PCell (or serving cell in IDLE), because then there is no cell that the UE is "anchored" to during the carrier frequency change.

Paging in legacy LTE occurs in a pre-defined occasion which allows the UE, in idle mode to sleep and only wake-up in time for this occasion. In connected mode, PDCCH decoding is also made efficient by only requiring the UE to monitor for P-RNTI during paging occasion, PO.

Like any other transmission in unlicensed spectrum, paging is subject to LBT, i.e. the eNB may have to postpone the paging transmission to the next PO. Since postponing by an entire DRX cycle is not desirable, a configurable paging occasion window (POW) is provided comprising multiple subframes to support multiple paging opportunities per DRX cycle.

While paging can happen inside or outside the serving cell DMTC it is a good practice by eNB to try to restrict paging within the serving cell DMTC to aid the UE in conserving power. Moreover, since a discovery signal such as the DRS appear in the DMTC it may be desirable to design paging requests to be carried in the DRS subframe. Note that paging request, paging signal, and paging message are used interchangeably.

A problem with receiving the paging request in the DRS is that in some cases, when not transmitted in SF0/5, the UE may need to check two possible SF scrambling codes. In unlicensed spectrum the DRS floats using SF scrambling 0 even when transmitted in subframes 1-4. Similarly, SF scrambling 5 could float into subframes 6-9. Hence the UE may need to perform the two hypotheses for the SF scrambling in order to determine if the SF contains the DRS and potentially the paging request or a normal SF containing user data and paging requests. If the paging request is transmitted in the subframe containing the DRS, the paging request uses the same scrambling code as the DRS instead of the subframe specific scrambling. Similar as system information, scheduling information for the paging message is transmitted on a PDCCH using the common search space, and therefore, it may be transmitted in the same subframe as the DRS.

This can be difficult in the UE since the detecting involves utilizing the full channel bandwidth (up to 20 MHz) if using the first symbol containing the CRS or possibly a narrowband (1.4 MHz) detection later in the subframe using the SSS/PSS signals. The first method can be considered processing intense while the later in increases the memory utilization.

It is therefore a desire to enable efficient paging and DRS reception for the UE.

SUMMARY

The invention is based on the understanding that, when possible, combining transmissions of discovery signal and paging messages may limit active time, and thus power consumption, of wireless devices operating in a cellular network. The invention is further based on the realization that operating in an unlicensed frequency band implies certain considerations for the combined transmissions.

According to a first aspect, there is provided a network node for wireless access operating in a cellular network for an unlicensed frequency band and arranged for serving wireless devices in the unlicensed frequency band. The serving of the wireless devices in the unlicensed band relies on making a clear channel assessment in the unlicensed band for ascertaining that the unlicensed band is currently not occupied by other transmissions and when not occupied commencing transmission. Upon commencing the transmission, the network node is arranged to attempt scheduling a paging message together with a message providing a discovery signal and determine whether the transmission of the discovery signal and the paging message use the same subframe scrambling code, and if they do, transmit the paging message and the discovery signal in the same subframe.

Upon determining that the discovery signal transmission and the paging message transmission use different subframe scrambling codes, the network node may be arranged to transmit a paging message with a same scrambling code as the discovery signal which is sent in a first subframe and repeat the same paging message in a subsequent subframe within the paging occasion window using the subframe specific scrambling code of the subsequent subframe. It is understood that transmission of the paging message in a subsequent subframe is subject to LBT and may thus float within the paging occasion window.

Upon determining that the discovery signal transmission and the paging message transmission use different subframe scrambling codes, the network node may be arranged to schedule and transmit the discovery signal in the first subframe and attempt transmission of the paging message in a subsequent subframe within a paging occasion window. The network node may be arranged to schedule and transmit the discovery signal in a first subframe and schedule and transmit the paging message in the subsequent subframe upon determining that the discovery signal transmission and the paging message transmission use different subframe scrambling codes when the network node assumes that the wireless devices are not capable of handling multiple hypotheses for scrambling codes.

Upon determining that the discovery signal transmission and the paging message transmission are subject to different subframe scrambling codes, the network node may be arranged to transmit the paging message and the discovery signal in the same subframe using the scrambling code of the discovery signal.

The network node may be arranged to transmit the paging message and the discovery signal in the same subframe also upon determining that the discovery signal transmission and the paging message transmission use different subframe scrambling codes when the network node assumes that the wireless devices are capable of handling multiple hypotheses for scrambling codes, and is arranged to transmit the paging message with a same scrambling code as the discovery signal in the first subframe and repeat the paging with the subframe specific scrambling code in a subsequent subframe upon determining that the discovery signal transmission and the paging message transmission are subject to different subframe scrambling codes when the network node cannot assume that the wireless devices are capable of handling multiple hypotheses for scrambling codes. The assumption whether the wireless devices are capable of handling multiple hypotheses for scrambling codes may be based on received signalling from the wireless devices about their capabilities.

The network node may combine one or more of the above demonstrated features.

According to a second aspect, there is provided a method of a network node for wireless access operating in a cellular network for an unlicensed frequency band and arranged for serving wireless devices in the unlicensed frequency band. The method comprises making a clear channel assessment in the unlicensed band for ascertaining that the unlicensed band is currently not occupied by other transmissions, and when not occupied commencing transmission. Upon commencing the transmission, the method comprises scheduling a paging message together with a message providing a discovery signal, and determining whether the transmission of the discovery signal and the paging message use the same subframe scrambling code, and if they do, transmitting the paging message and the discovery signal in the same subframe.

Upon determining that the DRS transmission and the paging message transmission use different subframe scrambling codes, the method may comprise transmitting a paging message with a same scrambling code as the discovery signal in a first subframe, and repeating the paging message in a subsequent subframe using the subframe specific scrambling code of the subsequent subframe. Upon determining that the discovery signal transmission and the paging message transmission use different subframe scrambling codes, the method may comprise scheduling and transmitting the discovery signal in the first subframe, and attempting transmission of the paging message in a subsequent subframe within a paging occasion window. The method may include that the scheduling and transmitting of the discovery signal in the first subframe and the attempting transmission of the paging message in the subsequent subframe upon determining that the discovery signal transmission and the paging message transmission use different subframe scrambling codes when the network node assumes that the wireless devices are not capable of handling multiple hypotheses for scrambling codes.

Upon the determining that the discovery signal transmission and the paging message transmission are subject to different subframe scrambling codes, the method may comprise transmitting the paging message and the discovery signal in the same subframe using the scrambling code of the discovery signal.

The method may comprise transmitting the paging message and the discovery signal in the same subframe also upon determining that the discovery signal transmission and the paging message transmission use different subframe scrambling codes when the network node assumes that the wireless devices are capable of handling multiple hypotheses for scrambling codes, and transmitting the paging message with a same scrambling code as the discovery signal in the first subframe and repeating the paging message in a subsequent subframe upon determining that the discovery signal transmission and the paging message transmission are subject to different subframe scrambling codes when the network node cannot assume that the wireless devices are capable of handling multiple hypotheses for scrambling codes.

The method may comprise receiving signalling from the wireless devices about their capabilities, wherein the assumption whether the wireless devices are capable of handling multiple hypotheses for scrambling codes is based on the received signalling from the wireless devices about their capabilities.

The method may combine the features demonstrated above.

According to a third aspect, there is provide a computer program comprising instructions which, when executed on a processor of a network node, causes the network node to perform the method according to the second aspect.

According to a fourth aspect, there is provided a user equipment, UE, arranged to operate in a cellular communication network and comprising an antenna arrangement, a receiver and a transmitter connected to the antenna arrangement, and a processing element, wherein the processing element is arranged to determine a UE capability associated with the UE whether being able to perform multiple hypotheses for subframe scrambling in order to determine if a subframe contains discovery reference signal, DRS, and potentially a paging request or a subframe without DRS but containing user data and paging requests, and cause the transmitter to transmit signalling to a network node of the cellular communication network about the capability.

According to a fifth aspect, there is provided a method of a user equipment, UE, arranged to operate in a cellular communication network. The method comprises determining a UE capability associated with the UE whether being able to perform multiple hypotheses for subframe scrambling in order to determine if a subframe contains discovery reference signal, DRS, and potentially a paging request or a subframe without DRS but containing user data and paging requests, and transmitting signalling to a network node of the cellular communication network about the capability.

According to a sixth aspect, there is provided a computer program comprising instructions which, when executed on a processor of a UE, causes the UE to perform the method according to the fifth aspect.

It is understood that transmission of the paging message in a subsequent subframe, as discussed above, is subject to LBT and may thus float within the paging occasion window.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

In the following disclosure, LTE will be used as a tangible example. However, the principles of inventive contributions herein may also be applicable to other systems, as will be readily understood from the disclosure below. Herein, the terms "wireless device" and "UE" are used interchangeably. Furthermore, the terms "network node", "eNodeB" and "eNB" are also used interchangeably.

Figure 1:
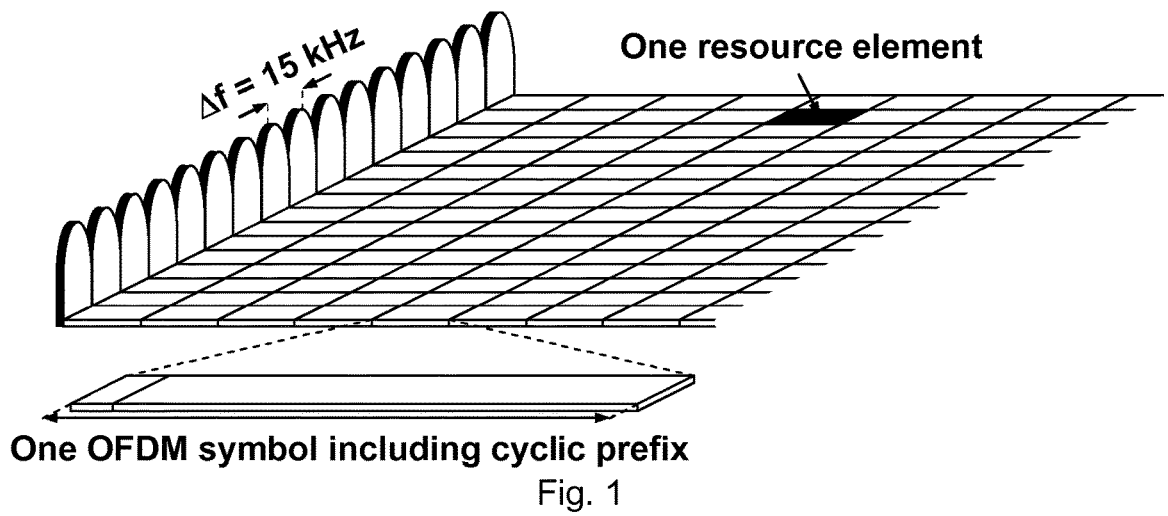
FIG. 1 schematically illustrates the LTE downlink physical resource grid.

LTE uses orthogonal frequency division multiplexing (OFDM) in the downlink and discrete Fourier transform (DFT) spread OFDM, also referred to as single-carrier frequency division multiple access (SC-FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

Figure 2:
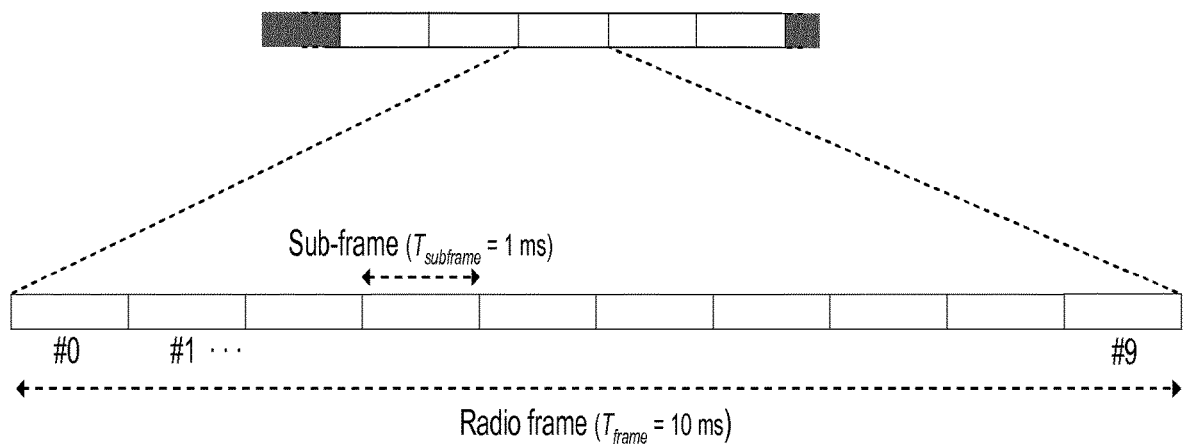
FIG. 2 schematically illustrates time-domain structure of LTE.

In the time domain, LTE downlink transmissions are organized into radio frames of 10 ms, each radio frame consisting of ten equally-sized subframes of length Tsubframe=1 ms as shown in FIG. 2. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3.

From LTE Rel-11 onwards, above described resource assignments can also be scheduled on the enhanced Physical Downlink Control Channel (ePDCCH). For Rel-8 to Rel-10 only Physical Downlink Control Channel (PDCCH) is available.

Figure 3:
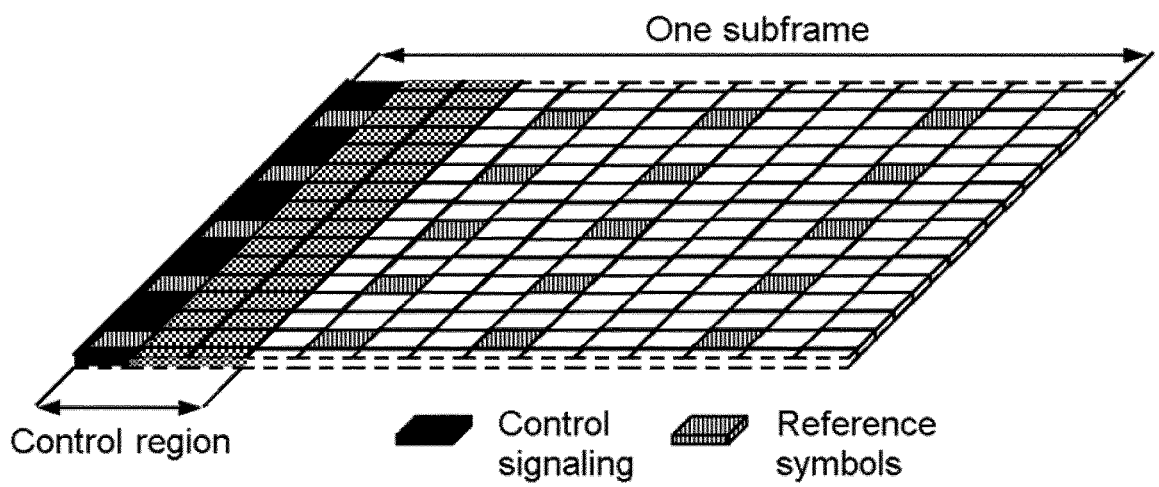
FIG. 3 schematically illustrates a normal downlink subframe structure in LTE.

The reference symbols shown in the above FIG. 3 are the cell specific reference symbols (CRS) and are used to support multiple functions including fine time and frequency synchronization and channel estimation for certain transmission modes.

The PDCCH/ePDCCH is used to carry downlink control information (DCI) such as scheduling decisions and power-control commands. More specifically, the DCI includes:

Downlink scheduling assignments, including Physical Downlink Shared CHannel (PDSCH) resource indication, transport format, hybrid-automatic repeat request (ARQ) information, and control information related to spatial multiplexing (if applicable). A downlink scheduling assignment also includes a command for power control of the Physical Uplink Control CHannel (PUCCH) used for transmission of hybrid-ARQ acknowledgements in response to downlink scheduling assignments.

Uplink scheduling grants, including Physical Uplink Shared CHannel (PUSCH) resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH/ePDCCH carries one DCI message containing one of the groups of information listed above. As multiple terminals can be scheduled simultaneously, and each terminal can be scheduled on both downlink and uplink simultaneously, a possibility to transmit multiple scheduling messages within each subframe is provided. Each scheduling message is transmitted on separate PDCCH/ePDCCH resources, and consequently there are typically multiple simultaneous PDCCH/ePDCCH transmissions within each subframe in each cell. Furthermore, to support different radio-channel conditions, link adaptation can be used, where the code rate of the PDCCH/ePDCCH is selected by adapting the resource usage for the PDCCH/ePDCCH, to match the radio-channel conditions.

Here follows a discussion on the start symbol for PDSCH and ePDCCH within the subframe. The OFDM symbols in the first slot are numbered from 0 to 6. For transmissions modes 1-9, the starting OFDM symbol in the first slot of the subframe for ePDCCH can be configured by higher layer signaling and the same is used for the corresponding scheduled PDSCH. Both sets have the same ePDCCH starting symbol for these transmission modes. If not configured by higher layers, the start symbol for both PDSCH and ePDCCH is given by the CFI value signaled in Physical Control Format Indicator CHannel (PCFICH).

Multiple OFDM starting symbol candidates can be achieved by configuring the UE in transmission mode 10, by having multiple ePDCCH Physical Resource Block (PRB) configuration sets where for each set the starting OFDM symbol in the first slot in a subframe for ePDCCH can be configured by higher layers to be a value from {1,2,3,4}, independently for each ePDCCH set. If a set is not higher layer configured to have a fixed start symbol, then the ePDCCH start symbol for this set follows the CFI value received in PCFICH.

Figure 4:
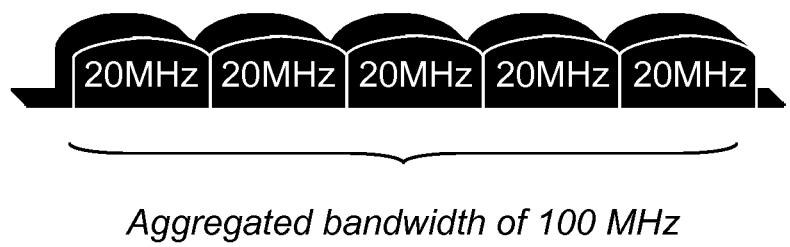
FIG. 4 is a schematic illustration of carrier aggregation.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is desired to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. 4. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a key feature of carrier aggregation is the ability to perform cross-carrier scheduling. This mechanism allows a (e)PDCCH on one CC to schedule data transmissions on another CC by means of a 3-bit Carrier Indicator Field (CIF) inserted at the beginning of the (e)PDCCH messages. For data transmissions on a given CC, a UE expects to receive scheduling messages on the (e)PDCCH on just one CC—either the same CC, or a different CC via cross-carrier scheduling; this mapping from (e)PDCCH to PDSCH is also configured semi-statically.

The UE performs periodic cell search and RSRP and RSRQ measurements in RRC Connected mode. It is responsible for detecting new neighbor cells, and for tracking and monitoring already detected cells. The detected cells and the associated measurement values are reported to the network. Reports to the network can be configured to be periodic or aperiodic based a particular event.

To share the channel in the unlicensed spectrum, the LAA SCell cannot occupy the channel indefinitely. One of the mechanisms for interference avoidance and coordination among small cells is SCell ON/OFF feature. In Rel-12 LTE, discovery signals were introduced to provide enhanced support for SCell ON/OFF operations. Specifically, these signals are introduced to handle potentially severe interference situation (particularly on the synchronization signals) resulted from dense deployment as well as to reduce UE inter-frequency measurement complexity.

Figure 5:
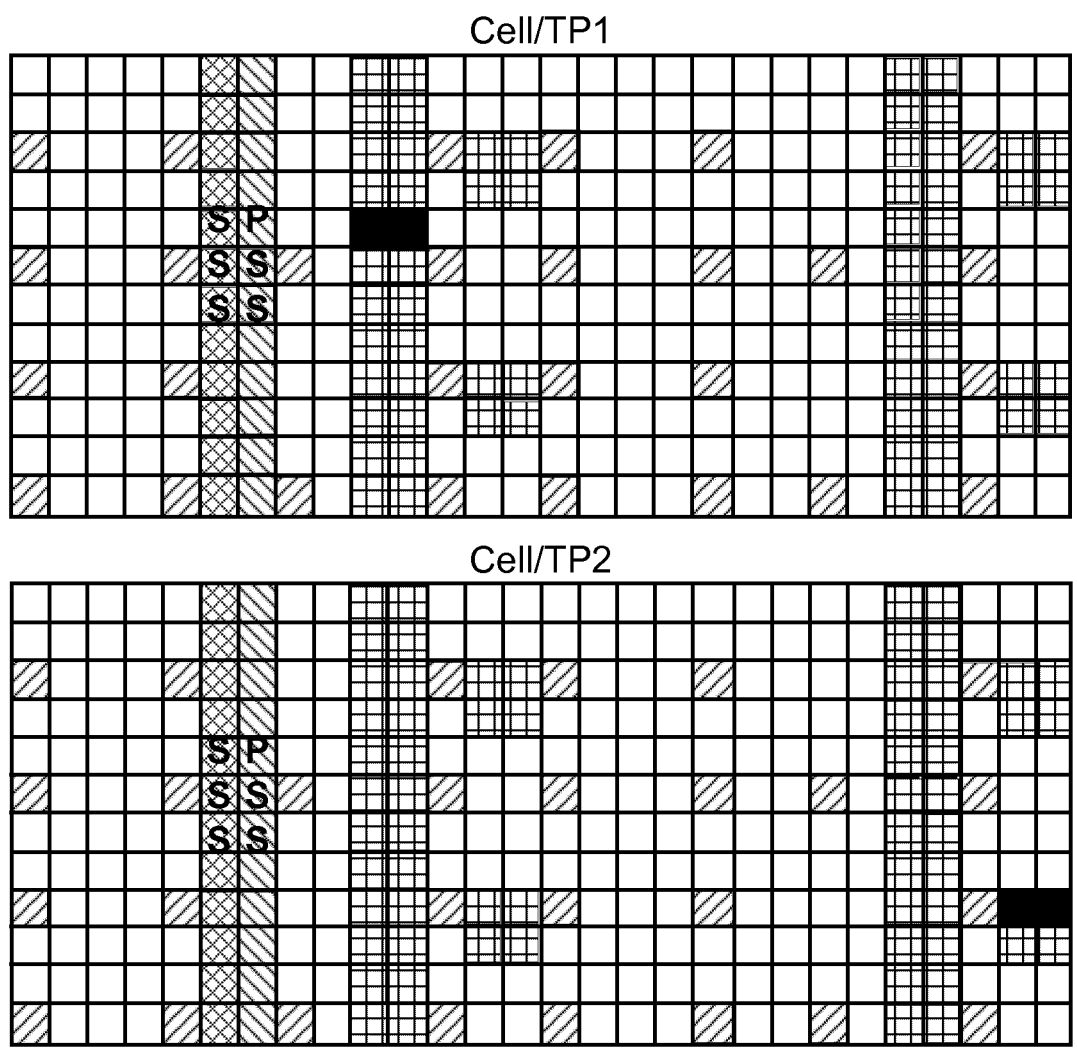
FIG. 5 illustrates presence of reference signals.

The discovery signals in a DRS occasion are comprised of the primary synchronization signal (PSS), secondary synchronization signal (SSS), CRS and when configured, the channel state information reference signals (CSI-RS). The PSS and SSS are used for coarse synchronization, when needed, and for cell identification. The CRS is used for fine time and frequency estimation and tracking and may also be used for cell validation, i.e., to confirm the cell ID detected from the PSS and SSS. The CSI-RS is another signal that can be used in dense deployments for cell or transmission point identification. FIG. 5 shows the presence of these signals in a DRS occasion of length equal to two subframes and also shows the transmission of the signals over two different cells or transmission points.

The DRS occasion corresponding to transmissions from a particular cell may range in duration from one to five subframes for FDD and two to five subframes for time division duplex (TDD). The subframe in which the SSS occurs marks the starting subframe of the DRS occasion. This subframe is either subframe 0 or subframe 5 in both frequency division duplex (FDD) and TDD. In TDD, the PSS appears in subframe 1 and subframe 6 while in FDD the PSS appears in the same subframe as the SSS. The CRS are transmitted in all downlink subframes and Downlink Pilot Time Slot (DwPTS) regions of special subframes.

The discovery signals should be useable by the UE for performing cell identification, reference signal received power (RSRP) and reference signal received quality (RSRQ) measurements. The RSRP measurement definition based on discovery signals is the same as in prior releases of LTE. The RSSI measurement is defined as an average over all OFDM symbols in the downlink parts of the measured subframes within a DRS occasion. The RSRQ is then defined as

DRSRQ=$N$×DRSRP/DRSSI, where N is the number of PRBs used in performing the measurement, DRSRP is the RSRP measurement based on the discovery signals and DRSSI is the RSSI measured over the DRS occasion.

In Rel-12, RSRP measurements based on the CRS and Channel State Information Reference Signal (CSI-RS) in the DRS occasions and RSRQ measurements based on the CRS in the DRS occasions have been defined. As stated earlier, discovery signals can be used in a small cell deployment where the cells are being turned off and on or in a general deployment where the on/off feature is not being used. For instance, discovery signals could be used to make RSRP measurements on different CSI-RS configurations in the DRS occasion being used within a cell, which enables the detection of different transmission points in a shared cell.

When measurements are made on the CSI-RS in a DRS occasion, the UE restricts its measurements to a list of candidates sent to the UE by the network via RRC signaling. Each candidate in this list contains a physical cell ID (PCID), a virtual cell ID (VCID) and a subframe offset indicating the duration (in number of subframes) between the subframe where the UE receives the CSI-RS and the subframe carrying the SSS. This information allows the UE to limit its search. The UE correlates to the received signal candidates indicated by a radio resource control RRC signal and reports back any CSI-RS RSRP values that have been found to meet some reporting criterion, e.g., exceeding a threshold value.

When a UE is being served on multiple carrier frequencies via a PCell and one or more SCells, the UE needs to perform radio resource management (RRM) measurements on other cells on the currently used carrier frequencies (intra-frequency measurements) as well as on cells on other carrier frequencies (inter-frequency measurements). Since the discovery signals are not transmitted continuously, the UE needs to be informed about the timing of the discovery signals so as to manage its search complexity. Furthermore, when a UE is being served on as many carrier frequencies as it is capable of supporting and inter-frequency RRM measurements need to be performed on a different carrier frequency that is not currently being used, the UE is assigned a measurement gap pattern. This gap pattern on a serving frequency allows the UE to retune its receiver for that frequency to the other frequency on which measurements are being performed. During this gap duration, the UE cannot be scheduled by the eNB on the current serving frequency. Knowledge of the timing of the discovery signals is especially important when the use of such measurement gaps is needed. Beyond mitigating UE complexity, this also ensures that the UE is not unavailable for scheduling for prolonged periods of time on the current serving frequencies (PCell or SCell).

The provision of such timing information is done via a discovery measurement timing configuration (DMTC) that is signaled to the UE. The DMTC provides a window with a duration of 6 ms occurring with a certain periodicity and timing within which the UE may expect to receive discovery signals. The duration of 6 ms is the same as the measurement gap duration as defined currently in LTE and allows the measurement procedures at the UE for discovery signals to be harmonized regardless of the need for measurement gaps. Only one DMTC is provided per carrier frequency including the current serving frequencies. The UE can expect that the network will transmit discovery signals so that all cells that are intended to be discoverable on a carrier frequency transmit discovery signals within the DMTCs. Furthermore, when measurement gaps are needed, it is expected that the network will ensure sufficient overlap between the configured DMTCs and measurement gaps.

The Rel-13 discovery signal used in unlicensed spectrum is based on the Rel-12 DRS, but with the last two symbols removed. In addition, due to the operation in unlicensed spectrum, the transmission is subject to LBT. To compensate for possible LBT failure (the channel is not sensed idle) the DRS is allowed to slide within a window, here referred to as DRS window.

Figure 6:
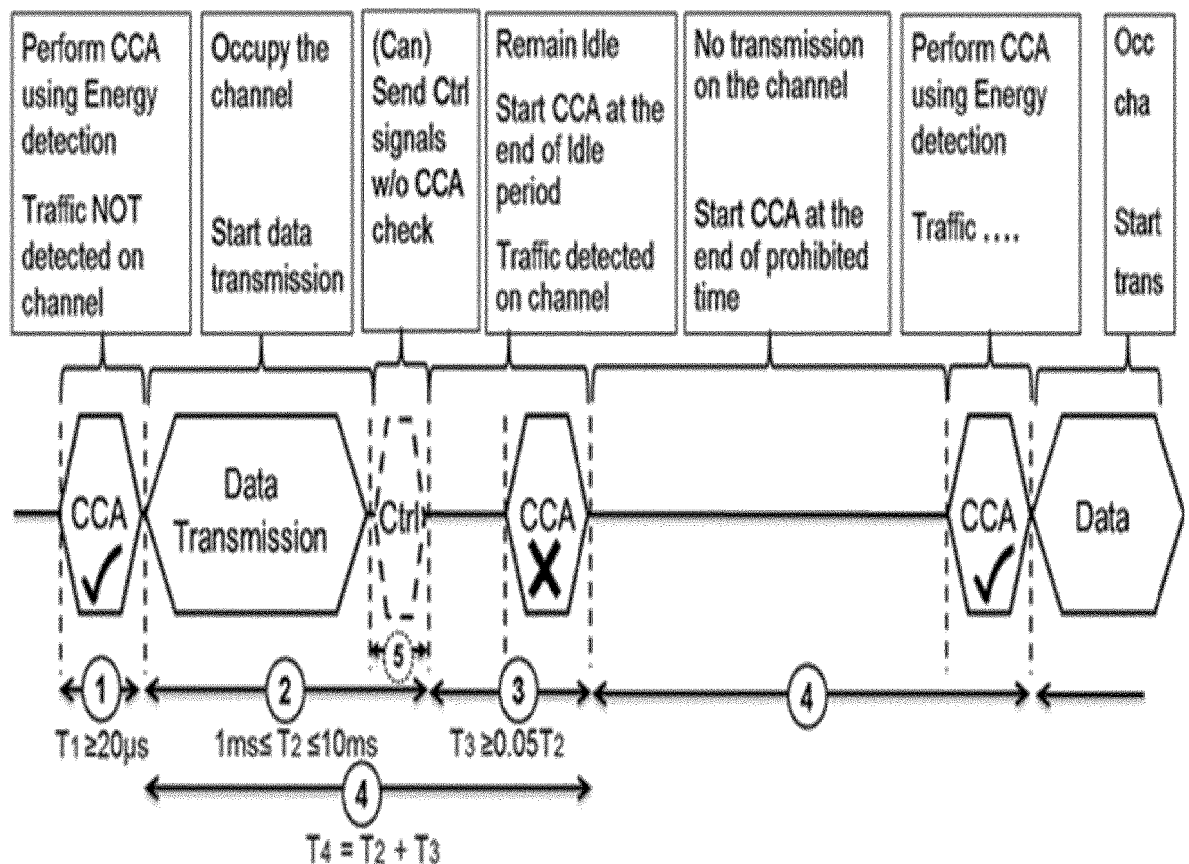
FIG. 6 schematically illustrates the listen before talk approach.

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several access points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the listen before talk (LBT) mechanism is shown in FIG. 6.

Traditionally, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Extending LTE to exploit unlicensed spectrum in addition to licensed spectrum is therefore considered. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Figure 7:
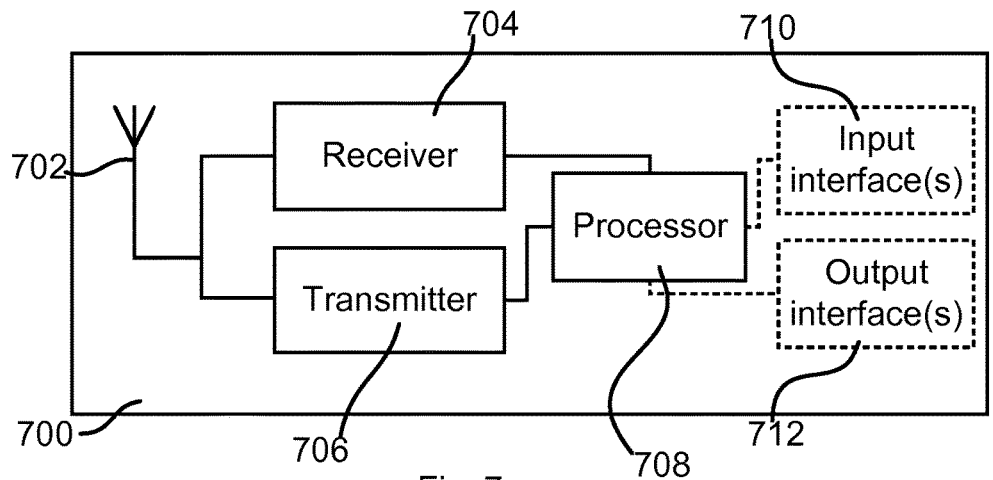
FIG. 7 is a block diagram schematically illustrating a wireless device according to an embodiment as well as a network node according to an embodiment.

Furthermore, one way to utilize the unlicensed spectrum reliably is to transmit essential control signals and channels on a licensed carrier. That is, as shown in FIG. 7, a UE is connected to a PCell in the licensed band and one or more SCells in the unlicensed band. In this application we denote a secondary cell in unlicensed spectrum as license assisted secondary cell (LA SCell).

In Standalone operations, the PCell will also operate on the unlicensed carrier and thus essential control signals and channels will also be subject to unmanaged interference and LBT.

It should be noted that in LAA according to 3GPP Release 13, DRS detection for RRM purposes could be performed concurrently on narrowband processing while decoding the normal subframes.

One solution is to allow the paging to be carried in the DRS and follow the DRS SF scrambling rules and mandate UEs to support multiple hypotheses, e.g. dual wideband hypotheses. However, if a UE cannot support multiple hypotheses, it can prioritize the reception of the paging request (scrambling SF0/5) and sacrifice the potential user data/control information. This in turn may cause throughput problems and poor user experience To solve the problem of UEs receiving paging requests in the DRS while it floats in the DMTC is to repeat the paging request in subsequent subframe which is utilizing the normal subframe sequence.

A further embodiment is to define a UE capability associated with a UE being able to perform the multiple hypotheses. If a UE is capable to performing multiple hypotheses, e.g. dual hypotheses, then the eNB would only schedule the paging request in the DRS. If a UE is not capable of performing multiple hypotheses, the paging request is scheduled in a normal SF (non-DRS) after DRS transmission within the DMTC.

It is an advantage that it is always possible for a UE which is capable of only performing one SF scrambling hypothesis to receive paging requests in the DMTC period. It is an advantage that, if the UE capability regarding the ability to perform e.g. dual SF scrambling detections is signalled to the eNB, the eNB can decide if it is necessary to schedule the additional subframe containing the paging request.

FIG. 7 is a block diagram schematically illustrating a wireless device 700 according to an embodiment. The wireless device comprises an antenna arrangement 702, a receiver 704 connected to the antenna arrangement 702, a transmitter 706 connected to the antenna arrangement 702, a processing element 708 which may comprise one or more circuits, one or more input interfaces 710 and one or more output interfaces 712. The interfaces 710, 712 can be user interfaces and/or signal interfaces, e.g. electrical or optical. The wireless device 700 is arranged to operate in a cellular communication network. In particular, by the processing element 708 being arranged to perform the embodiments demonstrated with reference to FIGS. 1 to 6 and 9 to 11, the wireless device 700 is capable of performing improved paging and DRS reception as disclosed herein. The processing element 708 can also fulfill a multitude of tasks, ranging from signal processing to enable reception and transmission since it is connected to the receiver 704 and transmitter 706, executing applications, controlling the interfaces 710, 712, etc.

FIG. 7 may also be seen as a block diagram schematically illustrating a network node 700 according to an embodiment. For the sake of brevity, FIG. 7 is thus recycled for the schematic illustration of elements of the network node 1200 demonstrated below with reference to FIG. 12. The network node comprises an antenna arrangement 702, a receiver 704 connected to the antenna arrangement 702, a transmitter 706 connected to the antenna arrangement 702, a processing element 708 which may comprise one or more circuits, one or more input interfaces 710 and one or more output interfaces 712. The interfaces 710, 712 can be operator interfaces and/or signal interfaces, e.g. electrical or optical. The network node 700 is arranged to operate in a cellular communication network. In particular, by the processing element 708 being arranged to perform the embodiments demonstrated with reference to FIGS. 1 to 6 and 9 to 11, the network node 700 is capable of performing improved paging and DRS transmission as disclosed herein. The processing element 708 can also fulfill a multitude of tasks, ranging from signal processing to enable reception and transmission since it is connected to the receiver 704 and transmitter 706, executing applications, controlling the interfaces 710, 712, etc.

Figure 8:
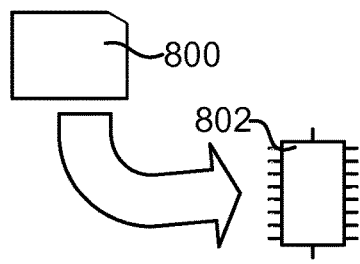
FIG. 8 schematically illustrates a computer-readable medium and a processing device.

The methods according to the present invention is suitable for implementation with aid of processing means, such as computers and/or processors, especially for the case where the processing element 708 demonstrated above comprises a processor handling paging and CRS reception and detection as disclosed herein. Therefore, there is provided computer programs, comprising instructions arranged to cause the processing means, processor, or computer to perform the steps of any of the methods according to any of the embodiments described with reference to FIGS. 1 to 6 and 9 to 11. The computer programs preferably comprise program code which is stored on a computer readable medium 800, as illustrated in FIG. 8, which can be loaded and executed by a processing means, processor, or computer 802 to cause it to perform the methods, respectively, according to embodiments of the present invention, preferably as any of the embodiments described with reference to FIGS. 1 to 6. The computer 802 and computer program product 800 can be arranged to execute the program code sequentially where actions of the any of the methods are performed stepwise. The processing means, processor, or computer 802 is preferably what normally is referred to as an embedded system.

Thus, the depicted computer readable medium 800 and computer 802 in FIG. 8 should be construed to be for illustrative purposes only to provide understanding of the principle, and not to be construed as any direct illustration of the elements.

Paging in legacy LTE occurs in a pre-defined occasion which allows the UE, in idle mode to sleep and only wake-up in time for this occasion. In connected mode, PDCCH decoding is also made efficient by only requiring the UE to monitor for the P-RNTI during the paging occasion.

In LTE, UEs can be paged for different reasons, e.g. for discontinuous reception (DRX) or for notification of system information changes. The eNB can configure Ns={1, 2, 4} paging occasions (PO) per paging frame (PF). PO and PF are UE specific and are derived from the UE identity (IMSI). The more UEs are served by a cell, the higher will be the number of paging occasions per paging frame in order to distribute the UEs and give higher chances to successfully page different UEs with minimal paging latency.

Configuration of discontinuous reception for paging is described in TS 36.304, Section 7 as:

The UE may use Discontinuous Reception (DRX) in idle mode in order to reduce power consumption. One Paging Occasion (PO) is a subframe where there may be P-RNTI transmitted on PDCCH addressing the paging message. One Paging Frame (PF) is one Radio Frame, which may contain one or multiple Paging Occasion(s). When DRX is used the UE needs only to monitor one PO per DRX cycle.

PF and PO is determined by following formulae using the DRX parameters provided in System Information [see TS 36.331 below]:

PF is given by following equation:

$$SFN \bmod T = (T \operatorname{div} N) * (UE\_ID \bmod N)$$

Index i_s pointing to PO from subframe pattern defined in 7.2 will be derived from following calculation:

$$i\_s = \operatorname{floor}(UE\_ID/N) \bmod Ns$$

System Information DRX parameters stored in the UE shall be updated locally in the UE whenever the DRX parameter values are changed in SI. If the UE has no IMSI, for instance when making an emergency call without USIM, the UE shall use as default identity UE_ID=0 in the PF and i_s formulas above.

The following Parameters are used for the calculation of the PF and i_s:

T: DRX cycle of the UE. T is determined by the shortest of the UE specific DRX value, if allocated by upper layers, and a default DRX value broadcast in system information. If UE specific DRX is not configured by upper layers, the default value is applied.

nB: 4T, 2T, T, T/2, T/4, T/8, T/16, T/32.

N: min(T,nB)

Ns: max(1,nB/T)

UE_ID: IMSI mod 1024.

IMSI is given as sequence of digits of type Integer (0 . . . 9), IMSI shall in the formulae above be interpreted as a decimal integer number, where the first digit given in the sequence represents the highest order digit.

The subframe patterns according to TS 36.304 are shown in Table 1.

TABLE 1

| | Subframe patterns | | | |
| --- | --- | --- | --- | --- |
| Ns | PO when i_s = 0 | PO when i_s = 1 | PO when i_s = 2 | PO when i_s = 3 |
| FDD: | | | | |
| 1 | 9 | N/A | N/A | N/A |
| 2 | 4 | 9 | N/A | N/A |
| 4 | 0 | 4 | 5 | 9 |
| TDD (all UL/DL configurations): | | | | |
| 1 | 0 | N/A | N/A | N/A |
| 2 | 0 | 5 | N/A | N/A |
| 4 | 0 | 1 | 5 | 6 |

Paging configuration is provided in SIB2, as is shown in TS 36.331, Section 6.3.1:

```
PCCH-Config ::=        SEQUENCE {
    defaultPagingCycle     ENUMERATED {
                               rf32, rf64, rf128, rf256},
    nB
                           ENUMERATED {
                               fourT, twoT, oneT, halfT, quarterT,
                               oneEighthT, oneSixteenthT,
                               oneThirtySecondT}
}
``` wherein defaultPagingCycle is default paging cycle, used to derive 'T' in TS 36.304. Value rf32 corresponds to 32 radio frames, rf64 corresponds to 64 radio frames and so on, and nB is used as one of parameters to derive the Paging Frame and Paging Occasion according to TS 36.304. Value in multiples of 'T' as defined in TS 36.304. A value of fourT corresponds to 4*T, a value of twoT corresponds to 2*T and so on.

Like any other transmission in unlicensed spectrum, paging is subject to LBT, i.e. the eNB may have to postpone the paging transmission to the next PO. Since postponing by an entire DRX cycle is not desirable a configurable paging occasion window (POW) comprising multiple subframes to support multiple paging opportunities per DRX cycle.

While Paging can happen inside or outside the serving cell DMTC it is a good practice by eNB to try to restrict paging within the serving cell DMTC to aid the UE in conserving power.

Moreover, since the DRS appear in the DMTC paging requests are preferable to be carried in the DRS subframe.

Figure 9:
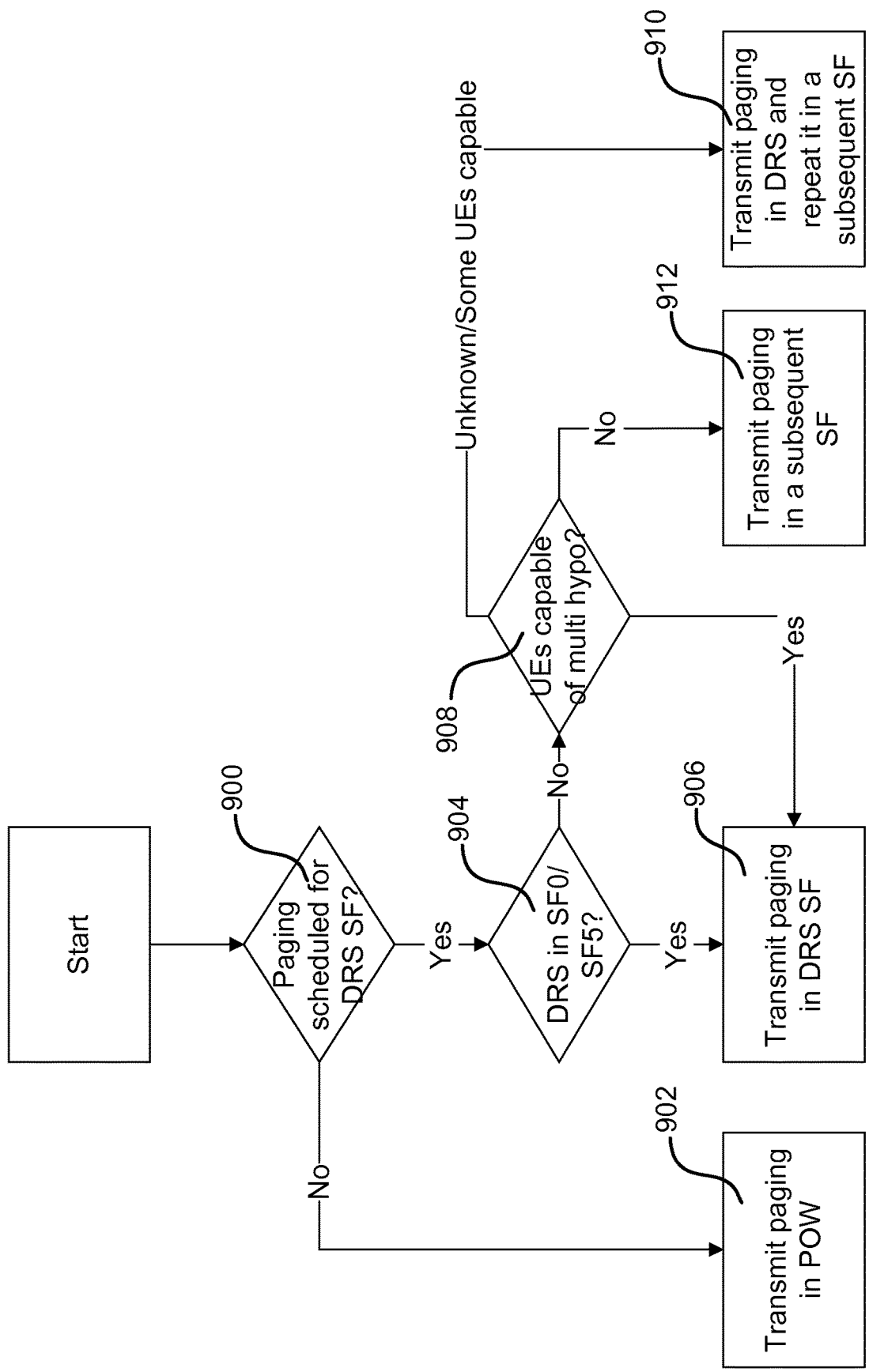
FIG. 9 is a flow chart schematically illustrating methods according to embodiments.
Figure 14:
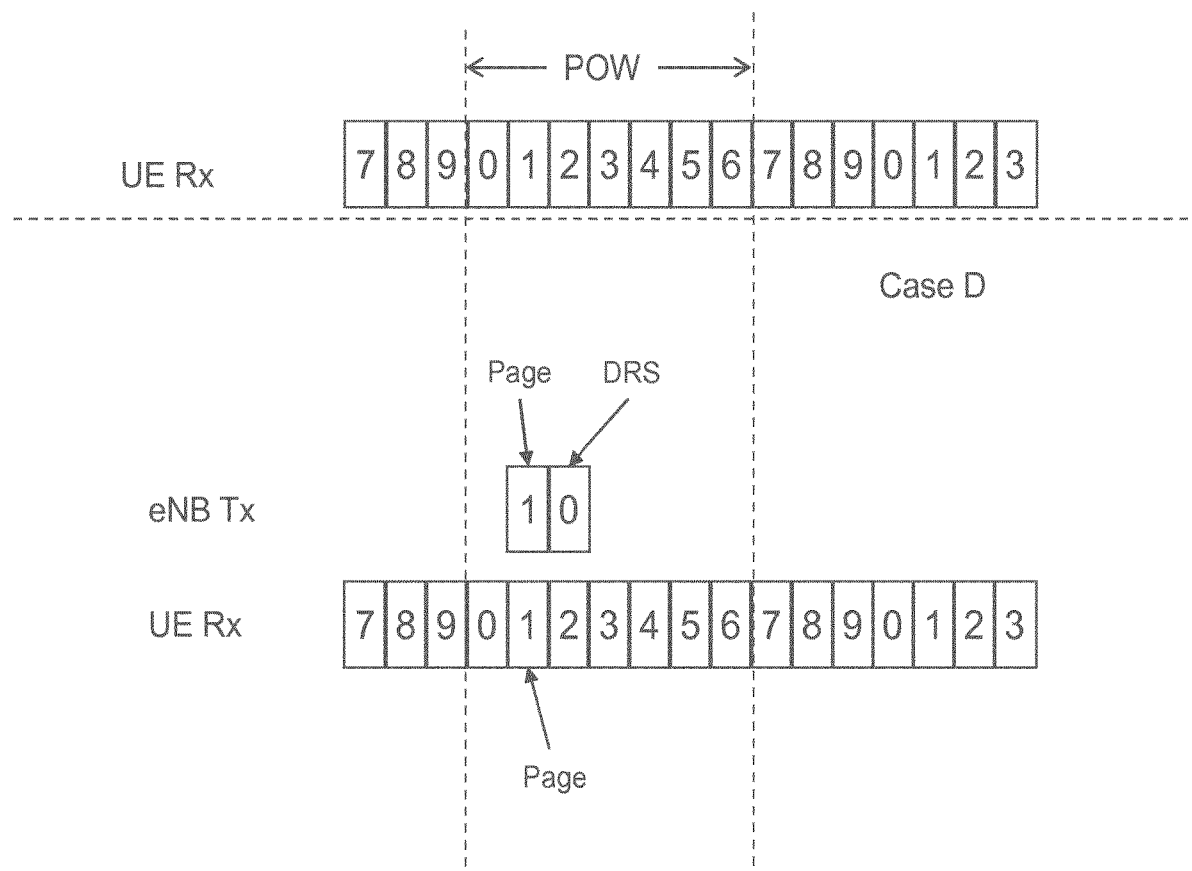
FIG. 14 illustrates a signal scheme for another case where DRS is postponed and sent after paging.

FIG. 9 is a flow chart schematically describing a method of a network node according to an embodiment. First, the eNB checks 900 if the paging message is scheduled to be transmitted in a first subframe, i.e. the subframe where a discovery signal is transmitted, e.g. the DRS subframe. If that is not the case, the paging can be transmitted 902 in any subframe in the POW without considering UE capabilities. Here, the "first subframe" is the first available subframe for transmission of the DRS, i.e. determined by LBT. In some embodiments, however, the transmission of the discovery signal may be postponed while the paging message follows its normal pattern, for example as illustrated in FIG. 14, which illustrates a signal scheme for another case where DRS is postponed and sent after paging, where the DRS is transmitted in a subsequent subframe to the one comprising the paging message. In the case the paging is scheduled for the DRS subframe, but in SF0 or SF5, which may be checked 904, the paging can be transmitted 906 in the same subframe as the DRS regardless of the UEs capabilities. This is further illustrated by Case A in FIGS. 10 and 11. In the case the paging is scheduled for the DRS subframe, but not in SF0 or SF5, the eNB needs to consider the UE capabilities of all UEs that will be paged in the subframe by checking 908 whether all UEs are capable of multiple hypotheses, as discussed above. If all concerned UE are capable of using multiple subframe-scrambling-hypotheses, the eNB schedules the paging message in the DRS subframe and transmits 906 the paging in the DRS subframe. This is further illustrated by Case B in FIG. 11. If some concerned UE is not capable of using multiple subframe-scrambling-hypotheses or the eNB is not aware of the UEs capabilities, the eNB schedules the paging message in the DRS subframe and repeats it in a subsequent subframe within the POW and transmits 910 the paging in the DRS subframe and repeats the paging in a subsequent subframe. In this context, a subsequent subframe may be a consecutive subframe or a subframe later on but within the POW. For example, the availability of the radio resource, as for LBT as discussed above, may influence which subframe that is used, and/or other preferences by the eNB. Depending on eNB implementation, the subsequent subframe can be either the next subframe after the DRS or a subframe later in the POW. This is further illustrated by Case B in FIG. 10. If no concerned UE are capable of using multiple subframe-scrambling-hypotheses, the eNB schedules the paging message in a subsequent (relative to the DRS) subframe within the POW and transmits 912 the paging in the subsequent subframe. Depending on eNB implementation, the subsequent subframe can be either the next subframe after the DRS or a subframe later in the POW. This is further illustrated by Case C in FIG. 10.

Here, the checking 908 relies on that the eNB has some knowledge about UE capabilities regarding handling multiple hypotheses for scrambling codes. This knowledge may be gained by receiving signalling from the UEs. Another alternative is that the capability of handling multiple hypotheses for scrambling codes is made mandatory, e.g. by the operator, for UEs operating in the unlicensed band. A further alternative is that it is a priori known that no UE (or at least too few to be considered) is capable of handling multiple hypotheses for scrambling codes, wherein only alternative as of 912 is applicable and the checking 908 and the alternative as of 910 may be omitted. One alternative is that the eNB does not have any knowledge, wherein the checking 908 and the alternatives that the eNB schedules the paging message in the DRS subframe, when DRS is not in subframe 0 or 5, and transmits 906 the paging in the DRS subframe, and the eNB schedules the paging message in a subsequent (relative to the DRS) subframe within the POW and transmits 912 the paging in the subsequent subframe will not be applicable. In such case, when the check 904 determines that the DRS is not in any of subframes 0 or 5, the procedure goes directly for that the eNB schedules the paging message in the DRS subframe and repeats it in a subsequent subframe within the POW and transmits 910 the paging in the DRS subframe and repeats the paging in a subsequent subframe, and the boxes 908 and 912 may be omitted.

Figure 10:
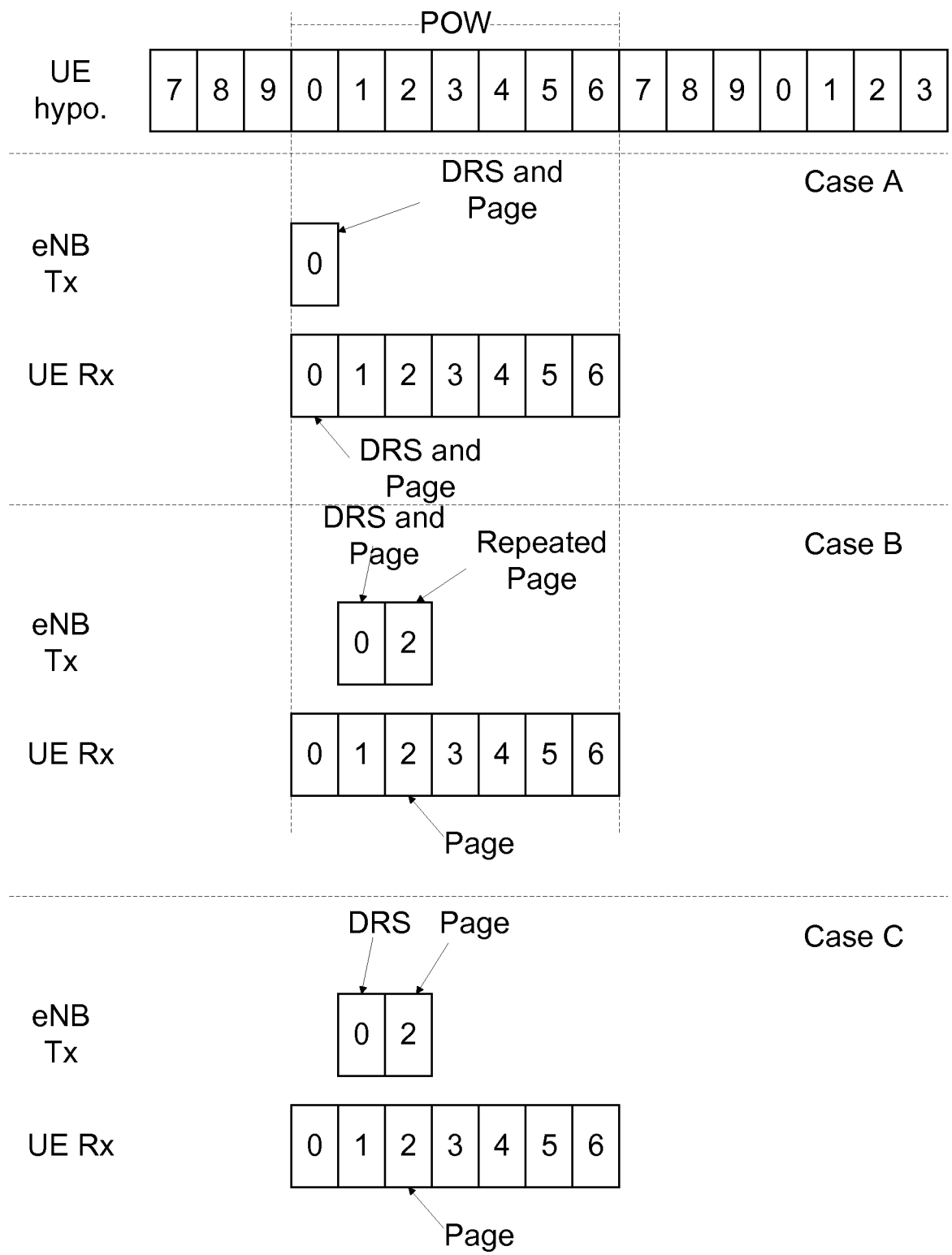
FIG. 10 illustrates signal schemes for different cases for a wireless device that is not capable of handling multiple hypotheses for scrambling codes.

FIG. 10 illustrates signal schemes for three different cases, Case A to C, for a wireless device that is not capable of handling multiple hypotheses for scrambling codes. The numbers in the boxes indicate subframe numbers used for the scrambling.

Figure 11:
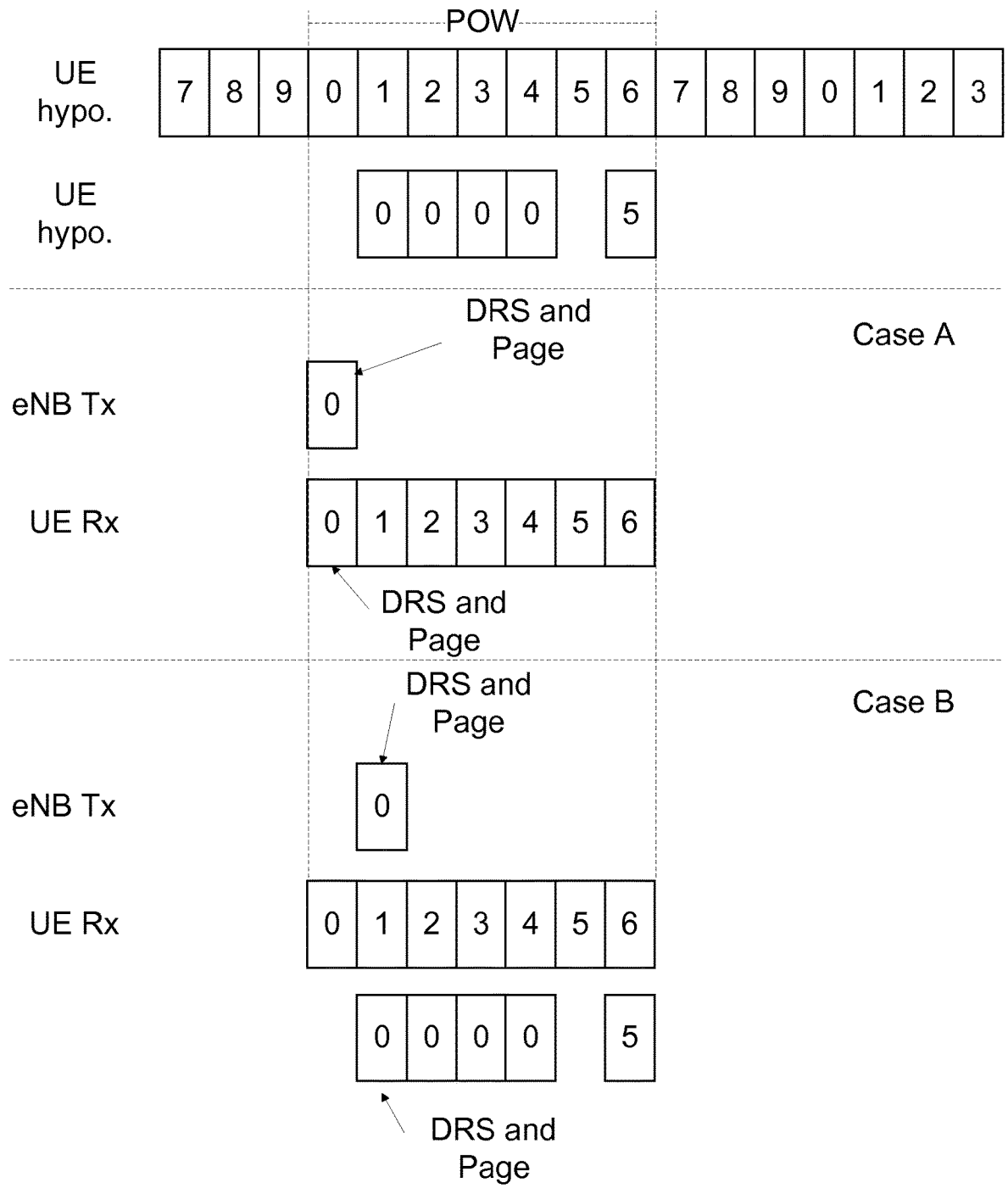
FIG. 11 illustrates signal schemes for different cases for a wireless device that is capable of handling multiple hypotheses for scrambling codes.

FIG. 11 illustrates signal schemes for two different cases, Case A and B, for a wireless device that is capable of handling multiple hypotheses for scrambling codes. The numbers in the boxes indicate subframe numbers used for the scrambling.

Figure 12:
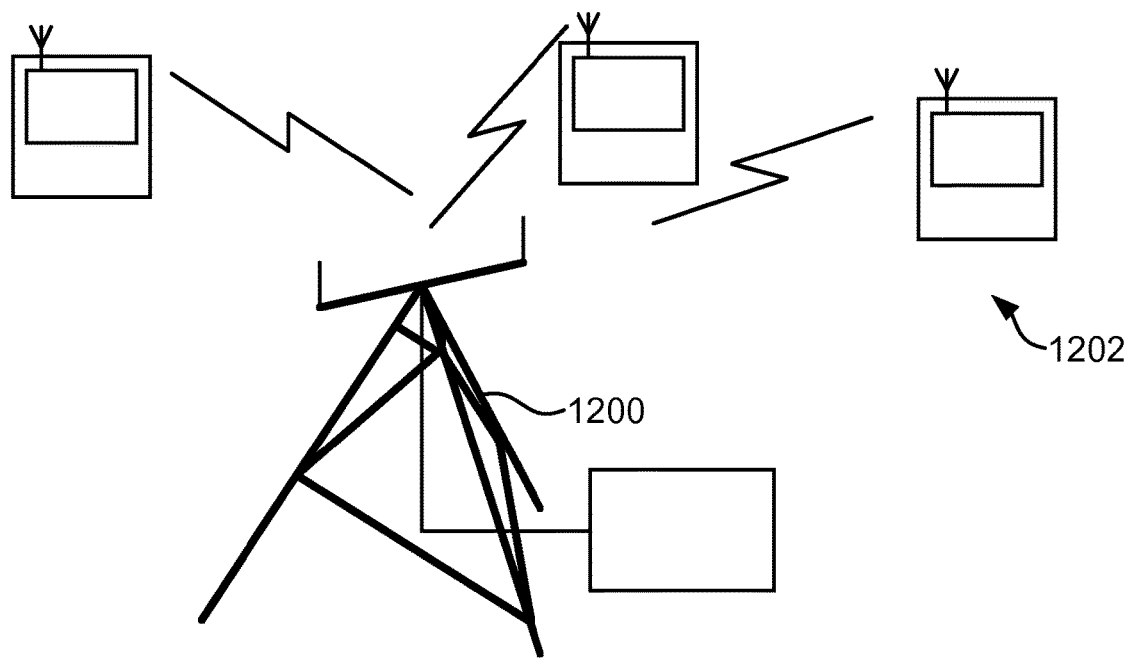
FIG. 12 illustrates a network node according to an embodiment.

FIG. 12 illustrates a cellular network comprising a network node 1200, e.g. an eNodeB, for wireless access operating in the cellular network for a licensed or unlicensed frequency band and arranged for serving wireless devices 1202 in an unlicensed frequency band. The network node is arranged to operate according to any of the approaches or combination of approaches as demonstrated above.

Figure 13:
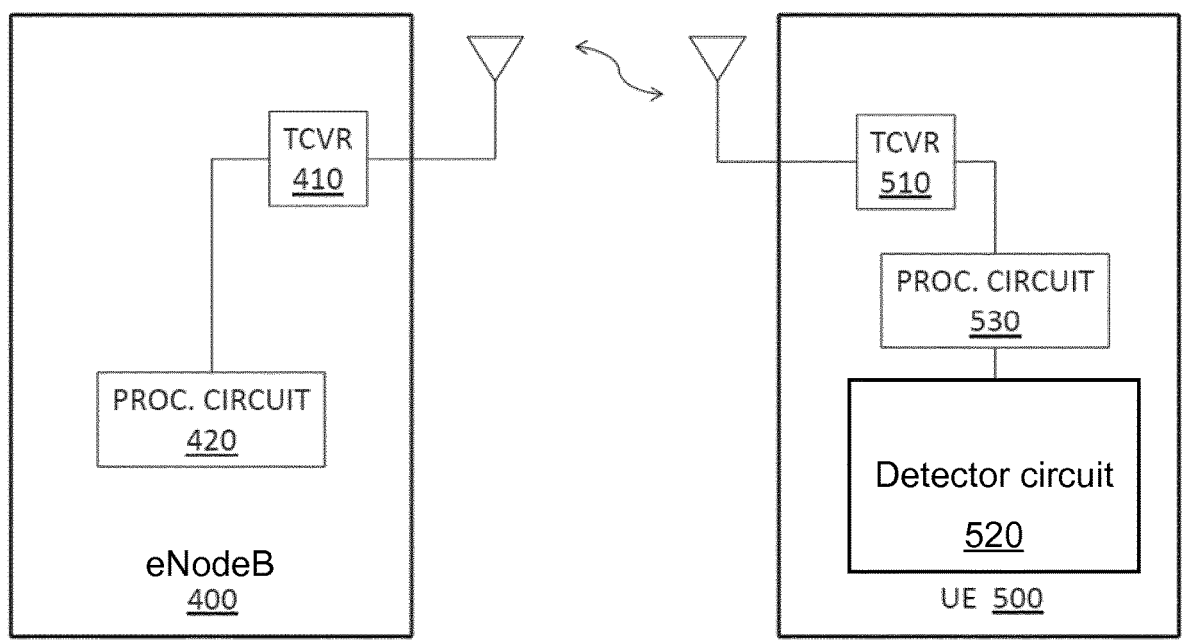
FIG. 13 is a block diagram schematically illustrating a network node and a wireless device according to an embodiment.

FIG. 13 shows a block diagram of one exemplary network node 400, e.g., eNodeB, serving a cell in unlicensed band and a wireless device 500 in an exemplary wireless communication network. The eNodeB 400 includes a transceiver 410 and a processing circuit 420. The transceiver 410 and/or processing circuit 420 may perform the steps detailed with reference to FIGS. 9 to 11. The wireless device 500 includes a transceiver 510, a detector circuit 520, and processing circuit 530. Transceiver 510 receives signals, among them DRS and paging signals according to any of the examples given above. Depending on the capabilities of the wireless device regarding handling multiple hypotheses for scrambling codes, the wireless device 500 is enabled by the eNodeB 400 to obtain DRS and paging information efficiently, which for example may provide the advantage of power saving, which may increase battery time of the wireless device 500.

The solutions presented herein provide many advantages over existing solutions. For example, the solution presented herein enables a MuLTEFire network to improve performance, as well as to other LTE-like transmissions in unlicensed spectrum.

The invention claimed is:

1. A network node for operation in a cellular network, wherein the network node is configured to serve wireless devices in an unlicensed frequency band, wherein the network node comprises:
   a transceiver; and
   processing circuitry,
   wherein the processing circuitry is configured to cause the network node to transmit a paging message by:
      ascertaining whether the unlicensed band is currently occupied by other transmissions;
      when the unlicensed band is occupied by other transmissions, delaying transmission of the paging message;
      when the unlicensed band is not occupied by other transmissions, commencing transmission of the paging message by:
         scheduling a paging message together with a message providing a discovery signal;
         determining whether the transmission of the discovery signal and the paging message use the same subframe scrambling code, and if they do, then transmitting the paging message and the discovery signal in the same subframe, and if they do not, then using one or more other criteria to control whether to transmit the paging message and the discovery signal in the same subframe.

2. The network node of claim 1, wherein upon determining that the discovery signal transmission and the paging message transmission use different subframe scrambling codes, the network node is arranged to transmit the paging message with a same scrambling code as the discovery signal which is sent in a first subframe and repeat the paging message in a subsequent subframe using the subframe specific scrambling code of the subsequent subframe when the network node cannot assume that the wireless devices are capable of handling multiple hypotheses for scrambling codes.

3. The network node of claim 1, wherein upon determining that the discovery signal transmission and the paging message transmission use different subframe scrambling codes, the network node is arranged to schedule and transmit the discovery signal in the first subframe and ascertain whether the unlicensed band is occupied by other transmissions in a subsequent subframe within a paging occasion window and transmit the paging message in the subsequent subframe when the unlicensed band is not occupied by other transmissions in the subsequent subframe.

4. The network node of claim 3, wherein the network node is arranged to schedule and transmit the discovery signal in a first subframe and schedule and transmit the paging message in the subsequent subframe upon determining that the discovery signal transmission and the paging message transmission use different subframe scrambling codes when the network node assumes that the wireless devices are not capable of handling multiple hypotheses for scrambling codes.

5. The network node of claim 1, wherein upon determining that the discovery signal transmission and the paging message transmission are subject to different subframe scrambling codes, the network node is arranged to transmit the paging message and the discovery signal in the same subframe using the scrambling code of the discovery signal.

6. The network node of claim 1, wherein the network node is arranged to transmit the paging message and the discovery signal in a same subframe upon determining that the discovery signal transmission and the paging message transmission use different subframe scrambling codes when the network node assumes that the wireless devices are capable of handling multiple hypotheses for scrambling codes, and is arranged to transmit the paging message with a same scrambling code as the discovery signal in the first subframe and repeat the paging with the subframe specific scrambling code in a subsequent subframe upon determining that the discovery signal transmission and the paging message transmission are subject to different subframe scrambling codes when the network node cannot assume that the wireless devices are capable of handling multiple hypotheses for scrambling codes.

7. The network node of claim 6, wherein assumption whether the wireless devices are capable of handling multiple hypotheses for scrambling codes is based on received signalling from the wireless devices about their capabilities.

8. The network node of claim 1,
wherein the network node is arranged to schedule and transmit the discovery signal in a first subframe and schedule and transmit the paging message in Ma a subsequent subframe upon determining that the discovery signal transmission and the paging message transmission use different subframe scrambling codes when the network node assumes that the wireless devices are not capable of handling multiple hypotheses for scrambling codes, and
wherein the network node is arranged to transmit the paging message and the discovery signal in a same subframe upon determining that the discovery signal transmission and the paging message transmission use different subframe scrambling codes when the network node assumes that the wireless devices are capable of handling multiple hypotheses for scrambling codes, and is arranged to transmit the paging message with a same scrambling code as the discovery signal in the first subframe and repeat the paging with the subframe specific scrambling code in a subsequent subframe upon determining that the discovery signal transmission and the paging message transmission are subject to different subframe scrambling codes when the network node cannot assume that the wireless devices are capable of handling multiple hypotheses for scrambling codes.

9. A method of a network node for wireless access operating in a cellular network for an unlicensed frequency band and arranged for serving wireless devices in the unlicensed frequency band, the method comprising:
making a clear channel assessment in the unlicensed band for ascertaining that the unlicensed band is currently not occupied by other transmissions; and
when not occupied commencing transmission, wherein upon commencing the transmission,
scheduling a paging message together with a message providing a discovery signal; and
determining whether the transmission of the discovery signal and the paging message use the same subframe scrambling code, and if they do, transmitting the paging message and the discovery signal in the same subframe, and if they do not, then using one or more other criteria to control whether to transmit the paging message and the discovery signal in the same subframe.

10. The method of claim 9, wherein upon determining that the DRS transmission and the paging message transmission use different subframe scrambling codes and that the network node cannot assume that the wireless devices are capable of handling multiple hypotheses for scrambling codes, the method comprises:
transmitting the paging message with a same scrambling code as the discovery signal in a first subframe; and
repeating the paging message in a subsequent subframe using the subframe specific scrambling code of the subsequent subframe.

11. The method of claim 9, wherein upon determining that the discovery signal transmission and the paging message transmission use different subframe scrambling codes,
scheduling and transmitting the discovery signal in the first subframe; and
ascertaining whether the unlicensed band is occupied by other transmissions in a subsequent subframe within a paging occasion window and transmitting the paging message in the subsequent subframe when the unlicensed band is not occupied by other transmissions in the subsequent subframe.

12. The method of claim 11, wherein the scheduling and transmitting of the discovery signal in the first subframe and the ascertaining whether the unlicensed band is occupied by other transmissions in the subsequent subframe and the transmitting the paging message in the subsequent subframe when the unlicensed band is not occupied by other transmissions in the subsequent subframe are performed upon determining that the discovery signal transmission and the paging message transmission use different subframe scrambling codes when the network node assumes that the wireless devices are not capable of handling multiple hypotheses for scrambling codes.

13. The method of claim 9, wherein upon the determining that the discovery signal transmission and the paging message transmission are subject to different subframe scrambling codes, transmitting the paging message and the discovery signal in the same subframe using the scrambling code of the discovery signal.

14. The method of claim 10, comprising transmitting the paging message and the discovery signal in the same subframe also upon determining that the discovery signal transmission and the paging message transmission use different subframe scrambling codes when the network node assumes that the wireless devices are capable of handling multiple hypotheses for scrambling codes, and transmitting the paging message with a same scrambling code as the discovery signal in the first subframe and repeating the paging message in a subsequent subframe upon determining that the discovery signal transmission and the paging message transmission are subject to different subframe scrambling codes when the network node cannot assume that the wireless devices are capable of handling multiple hypotheses for scrambling codes.

15. The method of claim 14, comprising receiving signalling from the wireless devices about their capabilities, wherein assumption whether the wireless devices are capable of handling multiple hypotheses for scrambling codes is based on the received signalling from the wireless devices about their capabilities.

16. The method of claim 14, wherein upon determining that the discovery signal transmission and the paging message transmission use different subframe scrambling codes, the method comprises:

scheduling and transmitting the discovery signal in the first subframe; and attempting transmission of the paging message in a subsequent subframe within a paging occasion window, and wherein the scheduling and transmitting of the discovery signal in the first subframe and the ascertaining whether the unlicensed band is occupied by other transmissions in the subsequent subframe and the transmitting the paging message in the subsequent subframe when the unlicensed band is not occupied by other transmissions in the subsequent subframe are performed upon determining that the discovery signal transmission and the paging message transmission use different subframe scrambling codes when the network node assumes that the wireless devices are not capable of handling multiple hypotheses for scrambling codes.

17. A non-transitory computer readable storage medium comprising a computer program comprising instructions which, when executed on a processor of a network node, causes the network node to perform a method for wireless access operating in a cellular network for an unlicensed frequency band and arranged for serving wireless devices in the unlicensed frequency band, the method comprising:

making a clear channel assessment in the unlicensed band for ascertaining that the unlicensed band is currently not occupied by other transmissions; and when not occupied commencing transmission, wherein upon commencing the transmission, scheduling a paging message together with a message providing a discovery signal; and determining whether the transmission of the discovery signal and the paging message use the same subframe scrambling code, and if they do, transmitting the paging message and the discovery signal in the same subframe, and if they do not, then using one or more other criteria to control whether to transmit the paging message and the discovery signal in the same subframe.

18. A wireless device arranged to operate in a cellular communication network and comprising:

an antenna arrangement;

a receiver;

a transmitter connected to the antenna arrangement; and a processing element, wherein the processing element is arranged to:

determine whether the wireless device has a capability to perform multiple hypotheses for subframe scrambling in order to determine if a subframe contains a discovery reference signal (DRS) transmitted using a first subframe scrambling code and a paging request transmitted using a second subframe scrambling code that is different from the first subframe scrambling code and to determine if a subframe does not contain a DRS and contains user data and paging requests; and cause the transmitter to transmit signalling to a network node of the cellular communication network that indicates whether the wireless device has the capability.

19. A method of a wireless device arranged to operate in a cellular communication network, the method comprising:

determining whether the wireless device has a capability to perform multiple hypotheses for subframe scrambling in order to determine if a subframe contains a discovery reference signal (DRS) transmitted using a first subframe scrambling code and a paging request transmitted using a second subframe scrambling code that is different from the first subframe scrambling code and to determine if a subframe does not contain a DRS and contains user data and paging requests; and transmitting signalling to a network node of the cellular communication network that indicates whether the wireless device has the capability.

20. A non-transitory computer readable storage medium comprising a computer program comprising instructions which, when executed on a processor of a wireless device arranged to operate in a cellular communication network, causes the wireless device to perform a method comprising:

determining whether the wireless device has a capability to perform multiple hypotheses for subframe scrambling in order to determine if a subframe contains a discovery reference signal (DRS) transmitted using a first subframe scrambling code and a paging request transmitted using a second subframe scrambling code that is different from the first subframe scrambling code and to determine if a subframe does not contain a DRS and contains user data and paging requests; and transmitting signalling to a network node of the cellular communication network that indicates whether the wireless device has the capability.

* * * * *

UNITED STATES PATENT AND TRADEMARK OFFICE
CERTIFICATE OF CORRECTION

PATENT NO. : 10,701,565 B2
APPLICATION NO. : 16/087653
DATED : June 30, 2020
INVENTOR(S) : Sugirtharaj et al.

It is certified that error appears in the above-identified patent and that said Letters Patent is hereby corrected as shown below:

In the Claims

In Column 17, Line 57, in Claim 8, delete "in Ma" and insert -- in --, therefor.

Signed and Sealed this
Twenty-second Day of September, 2020

Andrei Iancu
*Director of the United States Patent and Trademark Office*